R. COPP.
PISTON RING.
APPLICATION FILED FEB. 15, 1919.

1,434,591.

Patented Nov. 7, 1922.

INVENTOR:
Ralph Copp,
BY
Hugh N. Wagner,
ATTORNEY.

Patented Nov. 7, 1922.

1,434,591

UNITED STATES PATENT OFFICE.

RALPH COPP, OF ST. LOUIS, MISSOURI.

PISTON RING.

Application filed February 15, 1919. Serial No. 277,353.

*To all whom it may concern:*

Be it known that I, RALPH COPP, a citizen of the United States, residing at the city of St. Louis, in the State of Missouri, have invented certain new and useful Improvements in Piston Rings, of which the following is a specification.

This invention relates to piston heads and rings and to improved means for mounting piston rings on piston heads for use in cylinders where the piston is operated by fluid or liquid pressure or the like, and is adapted, for instance, for use in connection with pistons of milk pumps, water pumps, ammonia compressors, internal combustion engines, steam engines, etc.

It has for one of its objects to provide a piston ring of simple construction that will form a leak proof joint with the adjacent walls of the cylinder, under substantially all operative conditions, against the passage of fluid or the like through said joint, the construction and arrangement of parts of the device of this invention being such that, as the walls of the cylinder or the face of the ring wear in operation or otherwise as conforming adjustment may be required, the ring will automatically adjust itself to varied circumferential configuration of the parts to form the desired leak-proof joint.

Another object is to provide an improved seat for the piston ring in the piston head, to facilitate the automatic adjustment of the ring against the adjacent walls of the cylinder operatively to form the said leak-proof joint with a minimum friction of parts.

Other objects and the advantages of the present invention are described in this specification, and are set forth in the claim.

In the accompanying drawings forming part of this specification, in which like numbers of reference denote like parts wherever they occur.

Figure 1:
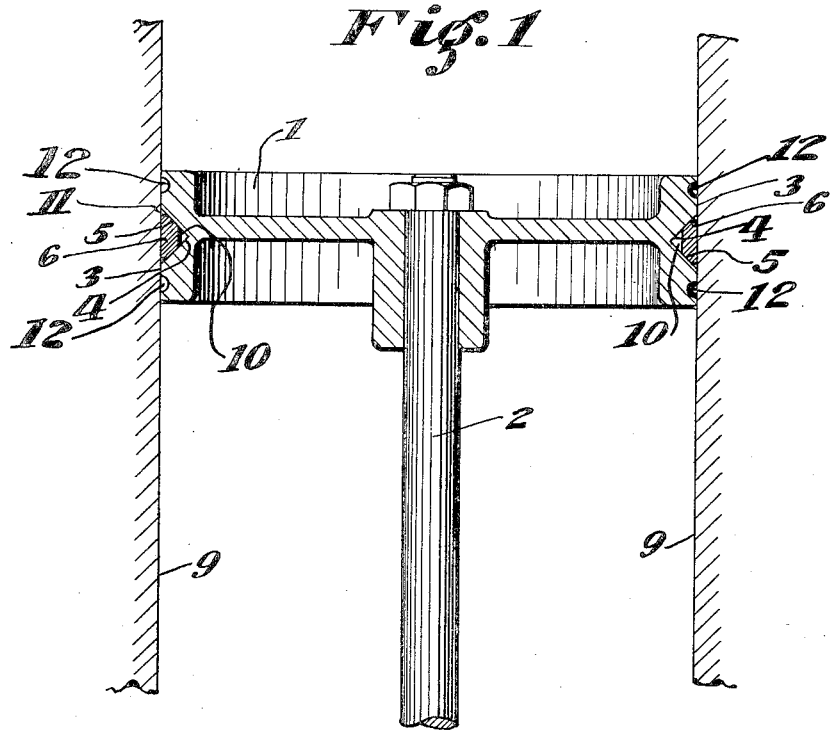
Figure 1 is a sectional view of the device of this invention operatively associated with a cylinder, a fragmentary section of the cylinder being depicted in the drawing.
Figure 2:
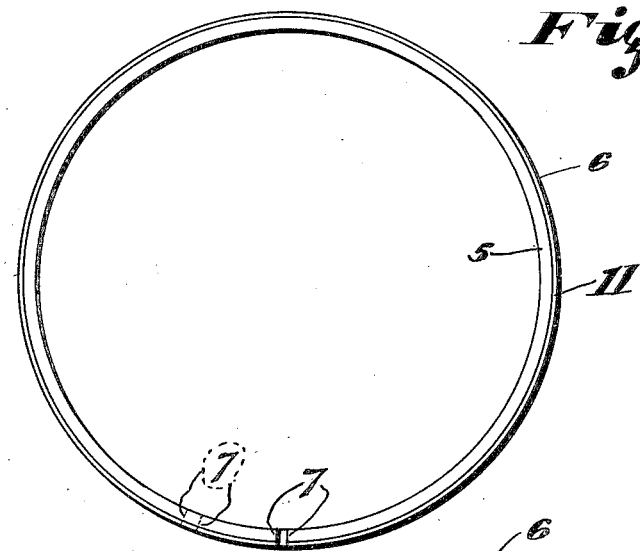
Figure 2 is a plan view looking down upon a beveled edge of the piston ring removed from the piston and the cylinder.

Piston head 1, of any suitable material and of any desired construction, may be mounted in a well-known manner, such, for instance, as that shown in the drawing, on stem 2. The peripheral face 3 of the said piston head 1 is provided with an outwardly-flared annular groove 4 substantially V-shaped in cross-sectional view, as shown in Figure 1, the inclined walls of said groove being adapted to seat the beveled edges 5 of piston ring 6 slidably thereon, the cross-sectional view of the piston ring 6 being substantially truncated triangle-shaped, the apex portion of the triangle being cut off, as best seen in Figure 1.

Figure 3:
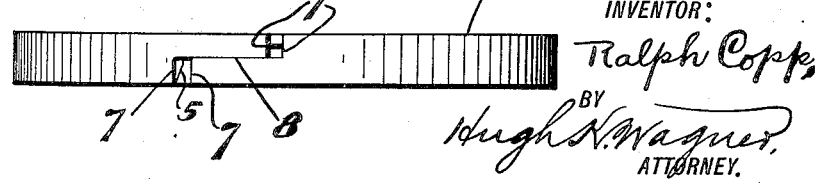
Figure 3 is an elevation of the piston ring of Figure 2, showing a front view looking at the staggered cut through the width of the ring.

Piston ring 6 may be made of spring steel or brass or any suitable material adapted for piston rings and having a tendency to spring adjacent ends apart circumferentially of the ring when the ring is cut through across its width. The piston ring 6 of this invention is cut through across its width by means of two spaced-apart and substantially radial cuts 7, each of said cuts entering from opposite edges of said ring and from points diagonally opposite each other, and each passing substantially halfway across the ring, there being a substantially arcual cut 8 through the thickness of the ring and running from the inner end of one radial cut 7 to the inner end of the other radial cut 7, thus completely severing the piston ring 6 across its width by means of a substantially staggered cut, as best seen in Figure 3, so that when piston ring 6 is mounted in groove 4 of piston head 1 in operative position in cylinder 9, as shown in Figure 1, the gaps at radial cuts 7 will be spaced apart and separated from each other by cut portions of the ring adjacent arcual cut 8, with the result that one gap at a radial cut 7 will not communicate with the other gap at the other radial cut, the cut portions of the ring adjacent arcual cut 8 being adapted to bear against each other to form a leak-proof joint, and the face of piston ring 6 will form a continuous seal with the adjacent inner wall of cylinder 9 substantially leak proof against fluid or the like, the channel 10 formed at the bottom of groove 4 when the parts are assembled as shown in Figure 1 permitting play for the slidable seating of the beveled edges 5 upon the inclined walls of groove 4 as the parts become worn from use.

For convenience of assembling and fitting, the parts and the edges of ring 6 adjacent its peripheral face may be rimmed with straight edges 11.

Ring 6 seated in groove 4 of piston head 1, with the parts mounted in operative position in a cylinder 9 (as shown in Figure 1), will operate, under resilient spring tension, to press closely outwardly against the adjacent inner wall of cylinder 9, and, as the piston moves reciprocatingly within the cylinder, the beveled edges 5 of ring 6 will adjust themselves slidably on their flared seats formed by the inclined sides of groove 4, so that the face of the ring will always present a sealing joint against the adjacent inner wall of the cylinder, and the said sealing joint will at all times be perfectly adjusted, with reference to the slidable engagement of the piston ring with the said inner wall of the cylinder, to form a leak-proof joint against the passage of fluid or the like.

It is, of course, understood that one piston ring 6 may be mounted on a piston head 1 (as shown in Figure 1) or that the said piston head may be provided with a plurality of grooves 4, with a ring 6 mounted in each groove, and, furthermore, various changes in the construction, arrangement, and combination of parts may be made without departing from the nature and spirit of the present invention.

Annular grooves 12, borne by the face of piston head 1, are channels for lubricating oil and the like, and are provided for the well-known purpose of facilitating the lubrication of parts by introducing lubricants into the same.

The cutting away of the apex of the piston ring is an important detail. By this arrangement there is an oil receiving channel always existent between the relative inner edge of the piston ring and the base of the piston groove to form a seal against leakage around the ring. Furthermore as the piston ring wears in use, the space between either upper or lower wall of such ring and the corresponding wall of the piston groove widens, and in either compression or firing stroke of the piston, the walls of the ring and groove adapted to be forced into contact in such movement must be capable of instantly assuming such position. With the apex of the ring cut away, there is no possible interference to such wall-contacting movement of the ring and groove, as the ring wall is shorter than the groove wall, and will more readily seat itself than would be the case if the ring were of the full shape of the groove.

Having thus described this invention, I hereby reserve the benefit of all changes in form, arrangement, order, or use of parts, as it is evident that many minor changes may be made therein without departing from the spirit of this invention or the scope of the following claim.

I claim:

A split piston-ring of triangular section having the apex cut away in substantial parallelism with the base or cylinder-engaging face of the ring and the edges of the ring adjacent the face rimmed with straight edges, said ring fitting within a piston groove of full triangular sectional shape having a base and altitude corresponding to that of the triangular outline defined by the walls of the ring so that when the base or cylinder engaging face of the ring is disposed flush with the cylinder engaging face of the piston a pressure space is provided between the walls of the groove and the adjacent rimmed edge of the ring while the inner parallel face of the latter will be spaced from the bottom of said groove.

In testimony whereof I hereunto affix my signature.

RALPH COPP.